United States Patent [19]

Salice

[11] Patent Number: 5,607,271
[45] Date of Patent: Mar. 4, 1997

[54] FASTENING DEVICE FOR A METAL FITTING PART PREFERABLY FOR A HINGE PART, PROVIDED WITH A FASTENING BOREHOLE

[75] Inventor: Luciano Salice, Carimate, Italy

[73] Assignee: Arturo Salice S.p.A., Novedrate, Italy

[21] Appl. No.: 437,061

[22] Filed: May 9, 1995

[30] Foreign Application Priority Data

| | | | |
|---|---|---|---|
| Jul. 8, 1994 | [DE] | Germany | 44 24 151.8 |
| Oct. 6, 1994 | [DE] | Germany | 44 38 285.5 |
| Dec. 14, 1994 | [DE] | Germany | 9420033 U |

[51] Int. Cl.⁶ .................................................. F16B 21/00
[52] U.S. Cl. .......................... 411/349; 411/354; 411/273
[58] Field of Search ...................................... 411/349, 354, 411/84, 85, 966, 264, 273, 383, 549, 550, 551

[56] References Cited

U.S. PATENT DOCUMENTS

| | | |
|---|---|---|
| 1,495,913 | 5/1924 | Lobuono . |
| 3,816,883 | 6/1974 | Dzus, Sr. et al. ................ 411/349 |
| 4,299,520 | 11/1981 | Iwata ........................... 411/437 |
| 4,696,611 | 9/1987 | Guay ........................... 411/349 |
| 4,789,287 | 12/1988 | Le .............................. 411/349 |
| 4,862,556 | 9/1989 | Grass . |
| 5,104,141 | 4/1992 | Grove et al. ..................... 411/354 |
| 5,310,299 | 5/1994 | Bernstein ........................ 411/354 |
| 5,346,349 | 9/1994 | Giovannetti ..................... 411/349 |

FOREIGN PATENT DOCUMENTS

| | | |
|---|---|---|
| 8620441 U | 7/1986 | Germany . |
| 8717482 U | 9/1988 | Germany . |
| 178179 | 2/1936 | Switzerland . |

Primary Examiner—Steven N. Meyers
Assistant Examiner—Tuyet-Phuong Pham
Attorney, Agent, or Firm—Keck, Mahin & Cate

[57] ABSTRACT

A fastening device for a fitting part, such as a hinge part, is provided with a fastening borehole. A bushing or a ring-shaped insertion part can be inserted in the previously drilled borehole and includes a continuous hole in an axial direction. A pin, provided with a head and penetrating the fastening borehole, is pivoted in the continuous hole. The continuous hole is positioned eccentrically in the bushing or in the ring-shaped insertion part. The pin is provided with an eccentric shaft part which protrudes over the hole and on which a clamping part is fastened.

61 Claims, 7 Drawing Sheets

FASTENING DEVICE FOR A METAL FITTING PART PREFERABLY FOR A HINGE PART, PROVIDED WITH A FASTENING BOREHOLE

The invention relates to a fastening device for a metal fitting part, preferably for a hinge part, provided with a fastening borehole with a bushing which can be inserted into a previously drilled hole and which possesses a continuous hole in the axial direction in which a pin provided with a head and penetrating the fastening borehole is pivoted.

Fastening devices of this type are known in different embodiments and mostly consist of a dowel-like bushing which can be inserted into a previously drilled hole and which is forced apart to anchor it in the hole by turning the pin provided with a spreader. Such a fastening device is known from German utility model 93 07 086 where the dowel-like bushing is connected to a fastening plate of the fitting part so that it is only inserted into the previously drilled hole during the mounting of the fitting part.

In a fastening device of the type described above known from German patent 41 24 727 a dowel-like bushing, which can be provided with metal parts for a better anchoring, is also inserted into a previously drilled hole and the bushing forced apart for its force and form locking anchoring in the hole by around a quarter turn of a flattened screw.

On the removal of the fitting parts, for example for the waste removal of the furniture parts provided with said fitting parts, however the bushing always remains in the previously drilled hole so that a type-by-type separation of the fitting parts such as is desirable for a waste disposal which saves the environment is not possible.

It is the object of the invention to create a fastening element of the type described above which can be manufactured economically and which can be mounted simply and quickly with a secure fit and which allows easy removal without leaving any part behind.

In accordance with the invention this object is solved for a fastening device of the characterised type in that the continuous hole is positioned eccentrically in the bushing or in a ring-shaped insertion part and that the pin is provided with an eccentric shaft part which protrudes out of the hole and on which a clamping part is fastened. In the fastening element in accordance with the invention the ring-shaped insertion part and the clamping part have been connected to the fitting part by the pin prior to the mounting. To mount the fastening device, the pin is turned into a position in which the two eccentricities are aligned in such a way to each other that the clamping part does not protrude over the insertion part in an axial top view so that the bushing or the ring-shaped insertion part can be inserted into the hole corresponding to the diameter of the insertion part without obstacle. By turning the pin, the clamping part is then moved out of the cylindrical jacket contour of the insertion part in a radial direction due to the two eccentricities so that it meshes in a force and or form locking manner to anchor the fastening device on the walls of the hole. To allow the pin to be turned for the anchoring of the fastening device, the head of the pin is provided with a slit or cross-slit. The anchoring can be performed by turning the pin up to around 180 degrees.

Advantageously, the clamping part consists of at least one washer. Here, the eccentricities of the insertion part and the shaft part are advantageously coordinated to each other in such a way that the washer is concentric or flush to the insertion part in one rotational position of the pin and protrudes radially over the insertion part in another rotational position.

The fastening device in accordance with the invention cannot only be mounted simply and quickly, because the insertion part together with the clamping part or the washer located in its jacket cylinder can be inserted without obstacle into a previously drilled hole, but can also be removed again by a simple reverse rotation of the pin, because due to this reverse rotation the clamping part and the washer are moved backwards into the jacket cylinder of the insertion part and thus the clamping is completely eliminated.

Advantageously, the washer is provided with at least one circumferential, blade-like edge. It is also possible that several washers with circumferential, blade-like edges rest on the eccentric shaft part.

In accordance with an inventive development it is provided that the washer is provided with at least one blade-like spiral-shaped thread pitch. It is ensured by this development that the thread pitch(es) cut(s) into the side walls of the hole when the pin is turned and by the rotation of the pin pull(s) the fastening device into the hole thus obtaining a particularly good and secure fit of the fastening part.

The eccentric shaft part advantageously possesses a smaller diameter than the shaft part of the pin resting in the bushing. The eccentric shaft part can be riveted to the washer or also provided with a thread and screwed by this to the washer.

In a further development of the invention it is provided that the head is provided with a radial extension or protrusion which works together with at least one counter-stop in the outer edge area of the fastening borehole of the fitting part. With corresponding stops it is ensured that the pin is not overtightened during its clamping and cannot be turned further back during its removal than would correspond to the loosening of the clamp connection. Advantageously, the extension and the counter-stop are positioned in such a way that they allow a turning of the pin of approximately 180 degrees.

In a further development of the invention it is provided that the extension is a nose-like protrusion positioned in a sector-like recess of a retaining part of the fitting part consisting of sheet or cast metal. This protrusion can also serve as an indicator which indicates during mounting or removal whether the fastening element is in its clamped or unlocked position.

The extension can also be a marginal area extended in a sector-like manner concentric to the head where the step-like transitions of the marginal area to the circumferential edge of the head form the stops.

The washers forming the clamping parts can be trapezium-shaped in cross-section to form the washers. Advantageously, the washers possess essentially the same diameter as the bushing.

The fastening of the washer on the eccentric shaft is advantageously adapted to the stop positions in such a way that the washer is flush with the bushing in an axial direction when one side of the extension is put into contact with a stop and protrudes radially when the other side of the extension is put into contact with the other stop.

In accordance with a special embodiment of the invention it is provided that the pin consists of two shaft parts of different diameters which each possess eccentric shaft parts and that the shaft parts penetrate eccentric boreholes of ring-shaped insertion parts and that the clamping bodies or washers are held on the eccentric shaft parts. In this embodiment of the invention a particularly good anchoring of the fastening element in the borehole is obtained as the devices which produce the clamping action are provided in twos. The bodies or washers producing the clamping action are provided at a fairly large axial distance to each other which produces a better anchoring in the borehole.

In accordance with an inventive development it is provided that the shaft is connected not to a head, but to a lever located above the fastening borehole. This lever can be moved by hand without a tool into the clamping position and back into the opening position again during removal.

In order to prevent the lever from becoming visible in an ugly manner in the mounted state, it is provided that the lever consists of a plate part which in the closed position covers parts of the fitting part, e.g. a fastening flange, edge to edge.

In order to align the bushing in the correct resting position, i.e. in the assembly position, flush with the previously drilled holes, it is provided in a further development of the invention that the bushing is provided with a flange which is held with a radial protrusion in a non-turnable position in a flanged corner of a plate part of the fitting part.

In order to allow a repositioning of the fitting part fastened by the fastening device in a simple manner, in a particularly preferred embodiment of the invention it is provided that the shaft part of the pin resting in the bushing is provided with a thread which meshes into the walls of the borehole of the bushing in a self-cutting manner or which is screwed into an internal thread of the borehole, and that the fastening borehole of the fitting part is an oblong hole. In this fastening device simultaneously with the turning of the pin through around half a turn, the shaft of the pin is also screwed into the bushing so that the fitting part to be fastened pushes securely against a furniture part or similar that is provided with the previously drilled hole for the insertion of the bushing. If the pin of the fastening device in accordance with the invention is now turned back through an angle of less than 180°, then the clamping part still meshes in a force or form-locking manner to the walls of the borehole so that the fastening device is still not completely loosened, but where the retaining head of the pin is removed so far from the fitting part to be fastened due to the screwing out of the shaft part that said fitting part can be adjusted for repositioning in accordance with the length of the oblong hole before it is finally positioned by means of a renewed tightening of the pin. Here, the pitch of the thread should be selected in such a way that the pin can be moved by a turn which is smaller than 180° between its position where it fastens the fitting part and its pre-mounted position in which the fitting part can still be moved over the length of the oblong hole.

In accordance with a preferred embodiment it is provided that two dowel-like bushings are connected to an under-plate on which a plate-shaped fitting part which covers the under-plate at least partially is fastened which is provided with two oblong holes with a common middle-line penetrated by the pins. In this embodiment, the fitting part, which can, for example, consist of a mounting plate for the hinge arm of a furniture hinge, can be moved in the direction of the oblong holes which are flush to each other.

Advantageously, the bushings are provided with collar-like protrusions contacting the edges of the oblong holes in a force-locking manner so that the protrusions contact the edges of the oblong holes with a certain pressure fit and the under-plate remains connected to the fitting part, for example the mounting plate, in a force-locking manner.

The collar-like protrusions can be positioned essentially only on sides of the oblong holes running diagonally to the middle line so that only the sides of the parts of the collar-like protrusions located on opposite sides of the borehole contact the side edges of the oblong holes. In this way, the width of the diameters of the oblong holes can essentially correspond to the width of the upper shaft part of the pin.

Advantageously, the bushings are supported with the front sides of base-like elevations on the lower side of the plate-shaped fitting part. In this way, a good fixing of the fitting part to be fastened is obtained. The fitting part or the mounting plate can be provided with a circumferential rim angled against the furniture part which roughly corresponds to the height of the base-like elevations and with which the plate-shaped fitting part grips over the under-plate.

The clamping part is advantageously a washer.

In a further embodiment of the invention it is provided that the diameter of the washer is larger than the diameter of the shaft part provided with the thread. Advantageously, the diameter of the washer corresponds to the external diameter of the bushing.

Here, the eccentricities of the bushing and the shaft part are advantageously coordinated to each other in such a way that the washer is concentric to or flush with the bushing in one rotational position of the pin and protrudes radially over the bushing in another rotational position. The fastening device in accordance with the invention cannot only be mounted simply and quickly, because the bushing together with the clamping part or the washer located in its jacket cylinder can be inserted without obstacle into a previously drilled hole, but can also be removed again by a simple reverse rotation of the pin, because due to this reverse rotation the clamping part and the washer are moved backwards into the jacket cylinder of the bushing and thus the clamping is completely eliminated.

Advantageously, the washer is provided with at least one circumferential, blade-like edge. It is also possible that several washers with circumferential, blade-like edges rest on the eccentric shaft part.

In accordance with one inventive development it is provided that the washer is provided with at least one blade-like spiral-shaped thread pitch. It is ensured by this development that the thread pitch(es) cut(s) into the side walls of the previously drilled hole when the pin is turned and by the rotation of the pin pull(s) the fastening device into the hole thus obtaining a particularly good and secure fit of the fastening part.

The eccentric shaft part advantageously possesses a smaller diameter than the shaft part of the pin resting in the bushing. The eccentric shaft part can be riveted to the washer or also provided with a thread and screwed by this to the washer.

In accordance with one advantageous development it is provided that the shaft part of the pin provided with the thread is longer between the head and the washer than the length of the bushing including the protrusions. Advantageously, the shaft part is around half the thread pitch longer than the bushing so that the pin can be turned by a turn which is less than one half turn between its loose and its fixed positions. If the pin is turned back to its open position then the washer in the open position within the jacket contour of the bushing contacts its lower edge so that any undesirable overturning is avoided.

In accordance with a further embodiment the task is solved for a fastening device of the type characterised in accordance with the invention in that the continuous hole is positioned eccentrically in the bushing and that the pin is provided with a shaft part on its end side on which a clamping part is fastened eccentrically and non-rotationally.

In this fastening device in accordance with the invention the bushing and the clamping part have been connected to the fitting part to be fastened by the pin prior to the mounting. To mount the fastening device, the pin is turned into a position in which the two eccentricities are aligned in such a way to each other that the clamping part does not protrude over the insertion part in an axial top view so that the bushing can be inserted into the hole corresponding to its diameter without obstacle. By turning the pin, the clamping part is then moved out of the cylindrical jacket contour of the bushing in a radial direction due to the two eccentricities so that it meshes in a force and/or form locking manner to anchor the fastening device on the walls of the previously drilled hole. To allow the pin to be turned for the anchoring of the fastening device, the head of the pin is provided with a slit or cross-slit. The anchoring can be performed by mining the pin up to around 180 degrees.

Advantageously, the clamping part consists of at least one washer with an eccentric borehole. Here, the eccentricities of the bushing and the borehole are advantageously coordinated to each other in such a way that the washer is concentric or flush to the insertion part in one rotational position of the pin and protrudes radially over the insertion part in another rotational position. The diameter of the washer is advantageously equal to the diameter of the bushing. The diameter of the washer can also be smaller than the diameter of the bushing.

The fastening device in accordance with the invention cannot only be mounted simply and quickly, because the bushing together with the clamping part or the washer located in its jacket cylinder can be inserted without obstacle into a previously drilled hole, but can also be removed again by a simple reverse rotation of the pin, because due to this reverse rotation the clamping part or the washer are moved backwards into the jacket cylinder of the bushing and thus the clamping is completely eliminated.

Advantageously, the washer is provided with at least one circumferential, blade-like edge. It is also possible that several washers with circumferential, blade-like edges rest on the shaft part. In accordance with an inventive development it is provided that the washer is provided with at least one blade-like spiral-shaped thread pitch. It is ensured by this development that the thread pitch(es) cut(s) into the side walls of the previously drilled hole when the pin is mined and by the rotation of the pin pull(s) the fastening device into the hole thus obtaining a particularly good and secure fit of the fastening part.

The shaft part carrying the washer with the eccentric borehole advantageously possesses a smaller diameter than the shaft part of the pin resting in the bushing. The shaft part can be riveted to the washer or also provided with a thread and screwed by this to the washer.

Advantageously, the borehole of the washer possesses a polygon profile at least in the area of the rivet head of the shaft part. If the washer is connected to the shaft part by riveting of the end of the shaft part, the shaft part is compressed so that it widens and essentially takes on a complementary shape to the polygon profile of the borehole so that not only a force locking, but in addition also a form locking connection of the washer to the shaft part is obtained.

Advantageously, the end-side end of the bushing is provided with an axial extension whose side stops form a radial extension of the pin. The extensions of both the bushing and the pin can be designed in a sector-like shape. The radial extension of the pin can advantageously be positioned on the upper end area of the washer.

The stops which form the extensions are advantageously positioned and designed in such a way that they allow a rotation of the pin in the bushing through around 180° in order to fully utilise the given eccentricities.

In a particularly advantageous embodiment it is provided that the shaft part of the pin resting in the bushing is provided with a thread which meshes into the walls of the borehole of the bushing in a self-cutting manner or which is screwed into an internal thread of the bushing. This embodiment makes it possible to loosen the fitting part to be fastened by unscrewing the pin out of the bushing so that the fitting part can be moved relative to the shaft of the pin if there is sufficient play between the shaft and the fastening borehole.

Advantageously, the fastening borehole of the fitting part is an oblong hole so that an adjustment of the fitting part is possible.

In the preferred embodiment of the fastening device in accordance with the invention simultaneously with the turning of the pin through around half a turn, the shaft of the pin is also screwed into the bushing so that the fitting part to be fastened pushes securely against a furniture part or similar that is provided with the previously drilled hole for the insertion of the bushing. If the pin is now turned back through an angle of less than 180°, then the clamping part still meshes in a force and/or form-locking manner to the walls of the borehole so that the fastening device is still not completely loosened, but where the retaining head of the pin is removed so far from the fitting part to be fastened due to the screwing out of the shaft part that said fitting part can be adjusted for repositioning in accordance with the length of the oblong hole before it is finally positioned by means of a renewed tightening of the pin. Here, the pitch of the thread should be selected in such a way that the pin can be moved by a turn which is smaller than 180° between its position where it fastens the fitting part and its pre-mounted position in which the fitting part can still be moved over the length of the oblong hole.

In accordance with one advantageous development it is provided that the shaft part of the pin provided with the thread is longer between the head and the washer than the length of the bushing including the protrusions. Advantageously, the shaft part is around half the thread pitch longer than the bushing so that the pin can be turned by a turn which is less than one half between its loose and its fixed positions. If the pin is turned back to its open position then the washer in the open position within the jacket contour of the bushing contacts its lower edge so that any undesirable overturning is avoided.

In the assembly of the fastening device in accordance with the invention with the pin screwed into the eccentric borehole of the bushing, it must be ensured that the jacket contour of the washer is flush with the cylindrical mantle of the bushing when the pin has been turned so far out of the bushing that it can be tightened by a turn of around 180°. This assembly state can be obtained easily with the fastening device in accordance with the invention in that the pin is screwed into the bushing in the manner required and then the riveting of the washer with that part of the shaft without thread being performed in a position in which the circumferential contour of the washer is aligned concentrically to the bushing or is flush with the mantle of the bushing.

In accordance with a preferred embodiment it is provided that two dowel-like bushings are connected to an under-plate on which a plate-shaped fitting part which covers the under-plate at least partially is fastened which is provided with two oblong holes with a common middle-line penetrated by the pins. In this embodiment, the fitting part, which can, for example, consist of a mounting plate for the hinge arm of a furniture hinge, can be moved in the direction of the oblong holes which are flush to each other.

Advantageously, the bushings are provided with collar-like protrusions contacting the edges of the oblong holes in a force-locking manner so that the protrusions contact the edges of the oblong holes with a certain pressure fit and the under-plate remains connected to the fitting part, for example the mounting plate, in a force-locking manner.

The collar-like protrusions can be positioned essentially only on sides of the oblong holes running diagonally to the middle line so that only the sides of the parts of the collar-like protrusions located on opposite sides of the borehole contact the side edges of the oblong holes. In this way, the width of the diameters of the oblong holes can essentially correspond to the width of the upper shaft part of the pin.

Advantageously, the bushings are supported with the front sides of base-like elevations on the lower side of the plate-shaped fitting part. In this way, a good fixing of the fitting part to be fastened is obtained. The fitting part or the mounting plate can be provided with a circumferential rim angled against the furniture part which roughly corresponds to the height of the base-like elevations and with which the plate-shaped fitting part grips over the under-plate.

One example of the invention is described in detail below by means of the drawing. In this

Figure 5:
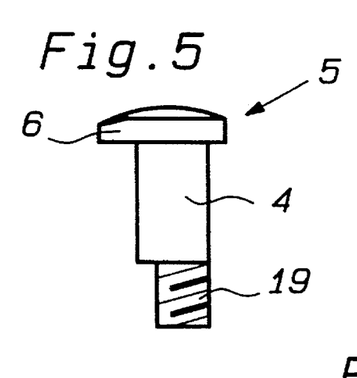
Figure 6:
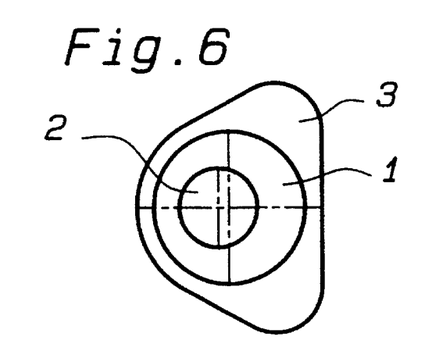
Figure 7:
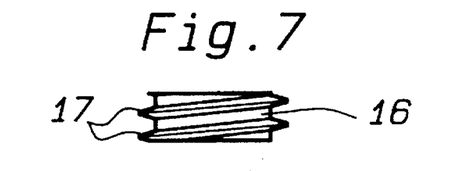

The first embodiment of a fastening device visible from FIGS. 1 to 7 consists of a cylindrical bushing 1 with an eccentric continuous borehole 2 whose eccentricity can be seen from FIG. 6. The cylindrical part of the bushing 1 is connected in one piece with an upper, triangular flange 3 with rounded corners where the tip of the triangle is rounded concentrically to the cylindrical main piece 1. The bushing 1 consists of plastic.

Figure 1:
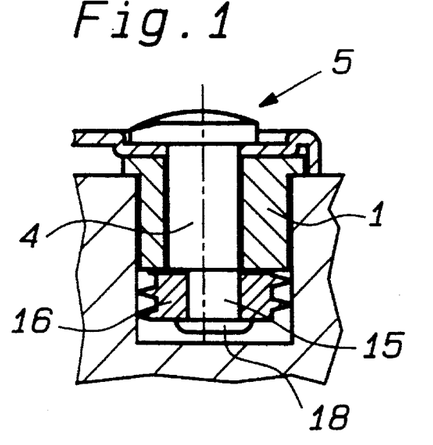
FIG. 1 shows a section through a first embodiment of a fastening device in its unclamped position inserted into a previously drilled hole, FIG. 2 the fastening device in accordance with FIG. 1 in its clamped position, FIG. 3 a bottom view of the fastening device in accordance with FIG. 1, FIG. 4 a top view of the fastening device in accordance with FIG. 1, FIG. 5 a side view of the pin with an eccentric shaft part provided with a thread, FIG. 6 a bottom view of the bushing without pin, FIG. 7 a side view of the clamping washer provided with two cutting thread pitches, FIG. 8 a section through a second embodiment of the fastening device with a pin with two eccentric shaft parts bearing clamping washers in the unclamped, inserted position.

In the borehole 2 of the bushing 1 rests the cylindrical shaft part 4 of a pin 5. The cylindrical shaft part 4 bears a widened head 6 which is provided with a cross-slit 7. The head 6 which otherwise consists of a circular washer-shaped part possesses a radial, nose-shaped protrusion 8, whose two flanks 9, 10 flow tangentially into the circular circumference of the head 6. The head 6 lies in a stamped recess 11 of a flange-shaped sheet metal part 12 of the fitting part. The stamped recess 11 possesses two wall parts 13, 14 concentric to the head 6 of which wall parts the wall part 13 has roughly the same radius of curvature as the circular washer-shaped part of the head 6, and the wall part 14 has a radius of curvature which corresponds to that of the extension 8. Between the two concentric wall parts, two straight wall sections which flow tangentially into the wall part 13 are provided which form stops for the flanks 9, 10 of the protrusion 8 so that the shaft 6 is held in the recess 11 in a position turnable through around 180 degrees.

Figure 2:
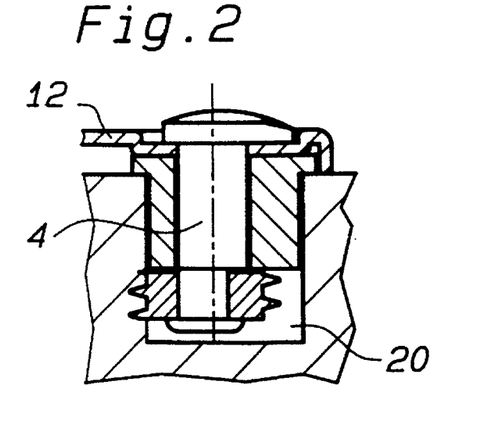

The shaft part 4 of the pin 5 is continued by means of an eccentric shaft part 15 with the eccentricity being visible from FIGS. 1, 2 and 5. A ring-shaped steel washer 16 rests on the eccentric shaft part 15 and said steel washer 16 is provided with two, spiral-shaped, cutting thread pitches 17. The lower end of the shaft part 15 is provided with a rivet head 18 by which the washer 16 and the bushing 11 are held on the flange 12.

In the pin 5 visible from FIG. 5, the eccentric shaft part 15 is provided with a thread 19 and the borehole of the washer 16 is provided with an internal thread so that the washer 16 can be screwed onto the eccentric shaft part 15.

Figure 3:
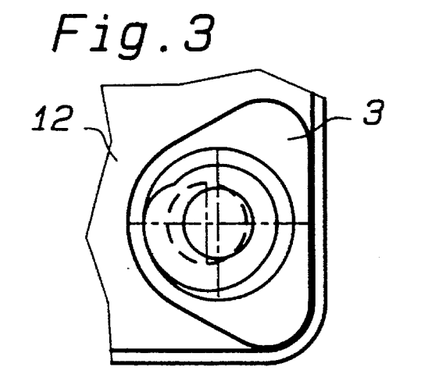
Figure 4:
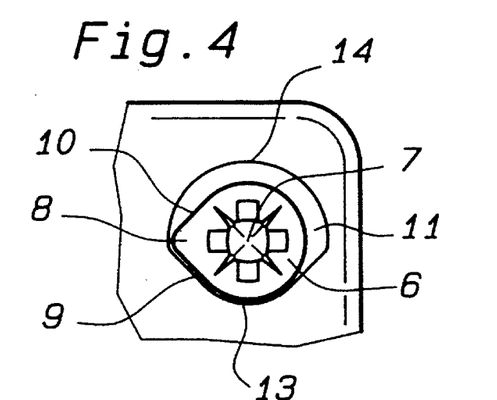

To ensure a positionally correct assembly of the fastening device to the flange 12, one rounded corner of the flange-shaped edge 3 of the bushing 1 lies in the manner visible from FIG. 3 in a flanged corner area of the flange 12 where the straight area which connects the corners contacts a straight section of the flanged edge.

In the insertion position visible from FIG. 1 the eccentricities of the borehole 2 and of the shaft 15 are aligned to each other in such a way that the blade-shaped pitches 17 lie on the extended jacket cylinder of the bushing 1 and the bushing 1 with the flush washer 16 can be inserted without obstacle into the correspondingly adjusted, previously drilled hole 20.

FIG. 2 shows the pin in its interlocked position turned through 180 degrees in which the cutting thread pitches 17 have cut into a part of the walls of borehole 20. As the thread pitches 17 are designed in a spiral shape, the fastening device is pulled into the hole 20 by the turning of the pin 5.

A second embodiment of the fastening device is now described by means of the FIGS. 8 to 14.

Figure 8:
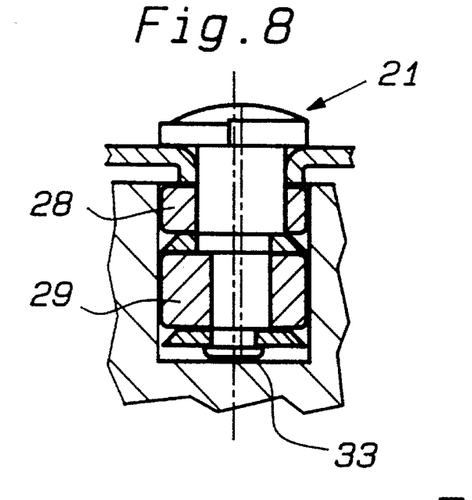

The pin 21 comprises a first cylindrical shaft part 23 provided with a head 22, a second shaft part 24 concentric to the first and of lower diameter, an eccentric shaft part 25 positioned between the two shaft parts 23, 24 and an eccentric shaft part 26 continuing the shaft part 24 where the eccentric shaft parts 25, 26 each have smaller diameters than the shaft parts 23, 24 which precede them. The eccentricity of the two shaft parts 25, 26 is aligned in the same direction and of the same size.

The first ring-shaped insertion part 28 provided with an eccentric borehole is held on the first shaft part 23 and the second ring-shaped insertion part 29 also provided with an eccentric borehole is held on the second shaft part 24.

The washers 30, 31 with circumferential blades are held on the eccentric shaft parts 25, 26. The fastening borehole of the flange-shaped fastening part 32 consists of a flanged borehole where the flanged edge is supported on the upper side of the ring-shaped insertion part 28 in the manner visible from FIGS. 8 and 9. The parts of the fastening device resting on the pin 21 are held together by a rivet head 33 fixed to the end of the eccentric shaft part 26.

The circular washer-shaped head 34 of the pin 21 consists of two concentric circumferential parts 35, 36 with different radii where the transition between the two circumferential parts is formed by steps 37, 38 which form counterstops for a stop 39 stamped into the flange 32. The pin 21 in the position represented by unbroken lines can be turned in the manner visible from FIG. 10 by means of the steps 37, 38 and the stamped stop 39 through 180 degrees into the position represented by dotted lines.

Figure 9:
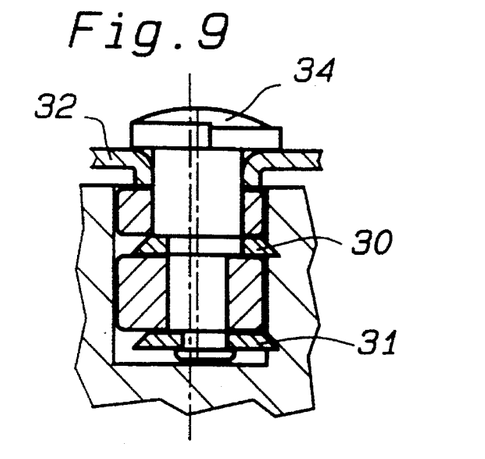
FIG. 9 a representation in accordance with FIG. 8 of the fastening device in the state clamped in the previously drilled hole, FIG. 10 a bottom view of the pin of the fastening device in accordance with FIG. 8, FIG. 11 a top view of the first ring-shaped insertion part, FIG. 12 a top view of the first clamping washer, FIG. 13 a top view of the second ring-shaped insertion part, FIG. 14 a top view of the lower clamping washer, FIG. 15 a side view of the pin in accordance with FIG. 10, FIG. 16 a longitudinal section through a third embodiment of a fastening device, FIG. 17 a longitudinal section through a fourth embodiment of a fastening device, FIG. 18 a side view of a fifth embodiment of a fastening device, FIG. 19 a top view of the fastening device in accordance with FIG. 18, FIG. 20 a cross-section through a fastening plate fastened to a piece of furniture by the fastening device in accordance with the invention, FIG. 21 a part of the fastening plate in accordance with FIG. 20 in a position in which the mounting plate can be adjusted in the direction of the double arrow A, FIG. 22 a side view of the pin, FIG. 23 a side view of the washer fastened on the eccentric shaft part of the pin, FIG. 24 a side view of the under-plate of the fastening plate with dowel-like bushings, FIG. 25 a top view of the under-plate in accordance with FIG. 24, FIG. 26 a top view of the mounting plate, FIG. 27 a cross-section through a fastening device in accordance with the invention whose washer, which is flush with the bushing, is inserted in the mounting position in a previously drilled blind hole of a piece of furniture, FIG. 28 a representation in accordance with FIG. 27 in the tightened, mounted position of the fastening device, FIG. 29 a representation in accordance with FIG. 28 of the fastening device in which, however, the pin has been turned back through an angle of less than 180° to allow an adjustment of the fitting part, FIG. 30 a side view of the pin prior to its riveting to the clamping washer, FIG. 31 a side view of the clamping washer, FIG. 32 a top view of the clamping washer in accordance with FIG. 31, FIG. 33 an exploded section from FIG. 32, FIG. 34 a bottom view of the under-plate of the fastening plate with dowel-like bushings, FIG. 35 a side view of the under-plate in accordance with FIG. 34, FIG. 36 a top view of the mounting plate.
Figure 10:
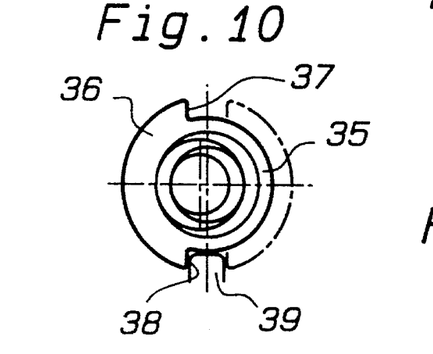
Figure 11:
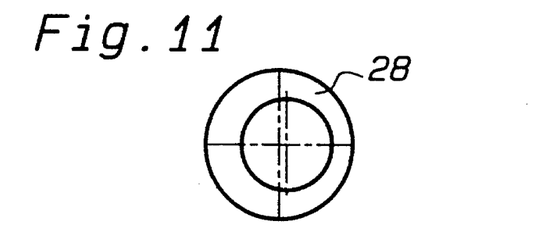
Figure 12:
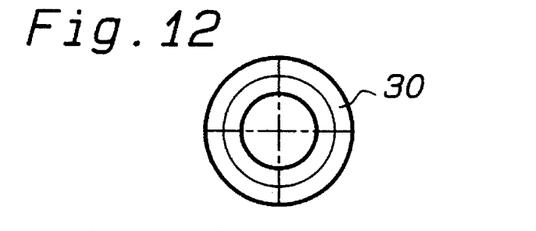
Figure 13:
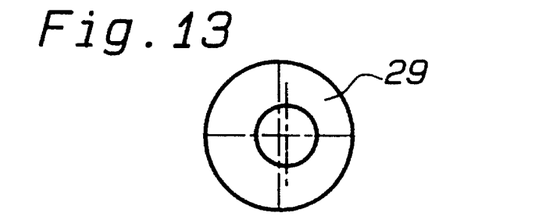
Figure 14:
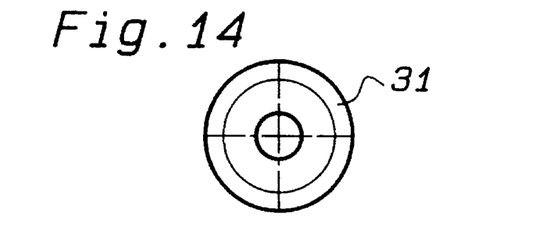
Figure 15:
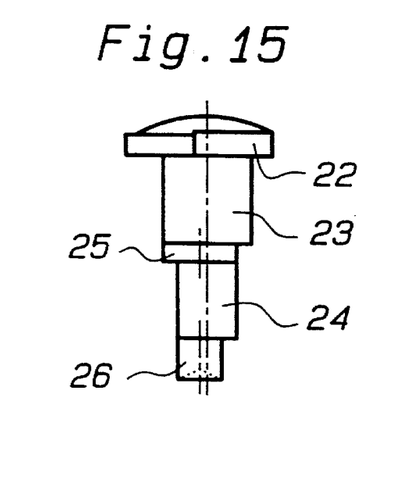

In FIG. 8 the fastening device is visible in its insertion position in which the circumferential blades of the washers 30, 31 are flush with the jacket surface of the cylindrical insertion parts 28, 29 while in FIG. 9 the interlocked position is visible in which the washers 30, 31 mesh in the same direction in a wall part of the previously drilled hole.

Figure 16:
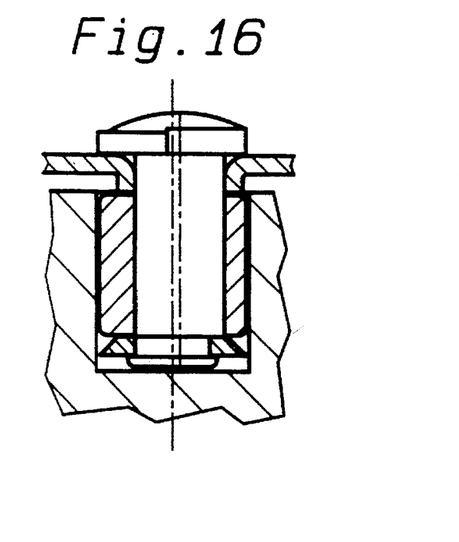
Figure 17:
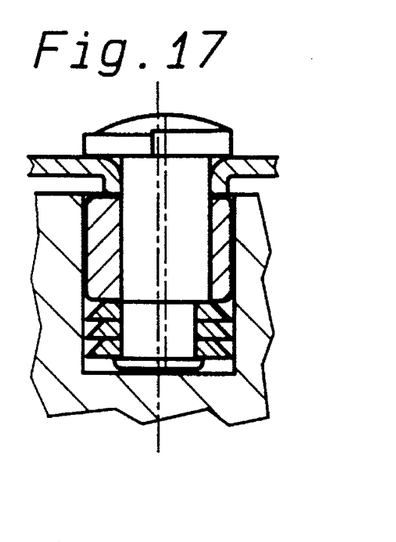

From FIGS. 16 and 17 two further embodiments of the fastening device are visible where in both embodiment examples in each case only one cylindrical insertion part is provided and the fastening device in accordance with FIG. 16 is provided with only one washer and the fastening device in accordance with FIG. 17 is provided with a package of three washers placed on top of one another.

Figure 18:
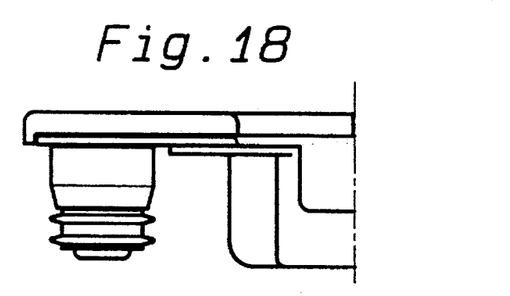
Figure 19:
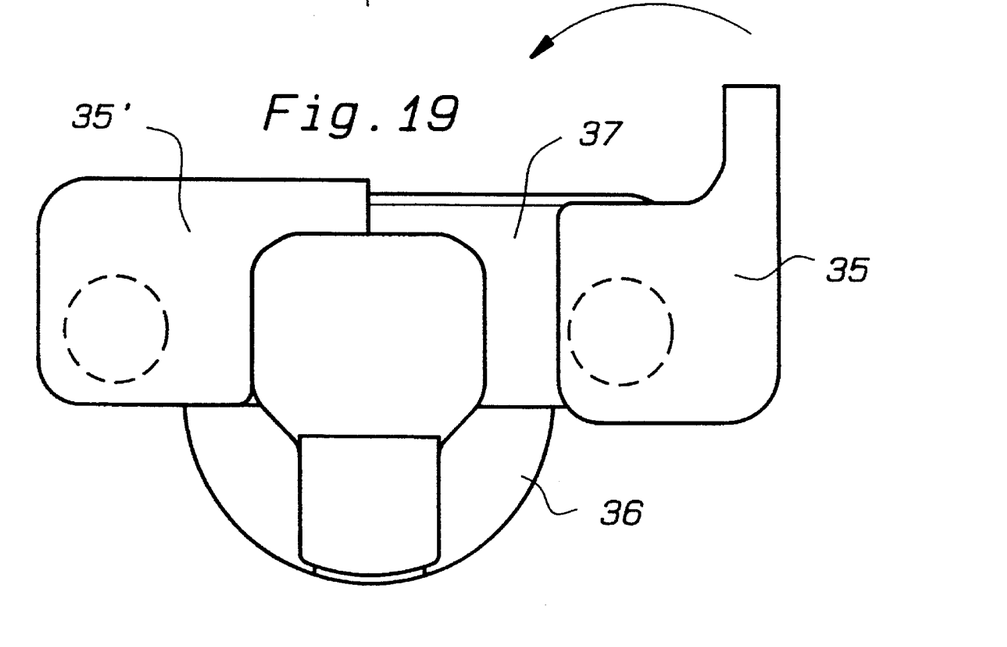

In the last embodiment in accordance with the FIGS. 18 and 19, the pin is provided instead of a head with a lever made from a plate part 35 so that the pin can be turned between its unlocked and its locked position by hand without a screwdriver using this lever. In the embodiment example in accordance with FIGS. 18 and 19 the fitting part consists of a so-called "insertion pot" of a two-link hinge where the pot-shaped part 36 which can be countersunk into a borehole is provided with a fastening flange 37. The activating parts 35, 35' of the two fastening devices correspond in their contours in a top view in each case to half of the fastening flange 37 so that the plate parts 35, 35' cover in their interlocked position the fastening flange 37 roughly edge to edge.

A further embodiment example of the invention is now described by means of FIGS. 20 to 26.

The fastening plate 102 is fastened to a furniture panel 101 with the fastening device in accordance with the invention.

The fastening plate 102 consists of a mounting plate 103, for example for the hinge arm of a furniture hinge, and an under-plate 104 covered by this. The under-plate 104 consists of an essentially strip-shaped plate part 105, preferably made from plastic, whose end areas are provided in one piece with dowel-like bushings 106 which possess eccentric continuous boreholes 107. On the side opposite to the bushings 106 the under-plate 104 is provided with roughly square, base-like elevations 108. On these base-like elevations 108 collar-like elevations 110, 111 are located laterally to the centre-line 109 of the under-plate 104 on opposite sides of the eccentric boreholes 107 and the height of said collar-like elevations 110, 111 corresponds to the thickness of the fastening plate 103 covering the under-plate 104. The fastening plate 103 consists of an elongated middle-piece 112 and side parts 113 cruciformly jointed to this which are provided with rectangular, oblong holes 114. The width of the oblong holes 114 corresponds to the width of the collar-like protrusions 110, 111 so that these contact the lateral edges of the oblong holes 114 in a force locking manner with their lateral edges in the assembly position visible from FIG. 20. The mounting plate 103 is provided with a central taphole 115 so that a hinge arm or another fitting part can be fastened to said mounting plate 103.

The pin 116 which serves to provide the interlocking is held in the eccentric boreholes 107 of the dowel-like bushings 106. The pin 116 is provided at the interface with a head 118 provided with a slit or a cross-slit 117 with a shaft part 119 free of thread and a shaft part 121 possessing a serf-cutting thread 120. The shaft part 121 is continued by an eccentric shaft part 122 of lower thickness on which the washer 124 provided with a serf-cutting thread 123 and which is provided with a centric borehole is positioned. To fasten the washer 124 to the shaft part 122 the end of the shaft part is provided with a rivet head 125.

The pin 116 with its shaft part 119 without thread and the interfacing shaft part 121 provided with the self-cutting thread is held in the eccentric continuous borehole 107 or the dowel-shaped bushing 106. Here, the self-cutting thread pitches 120 cut into the walls of the borehole 107 so that the pin can be screwed into and out of the borehole by a limited mount.

Figure 20:
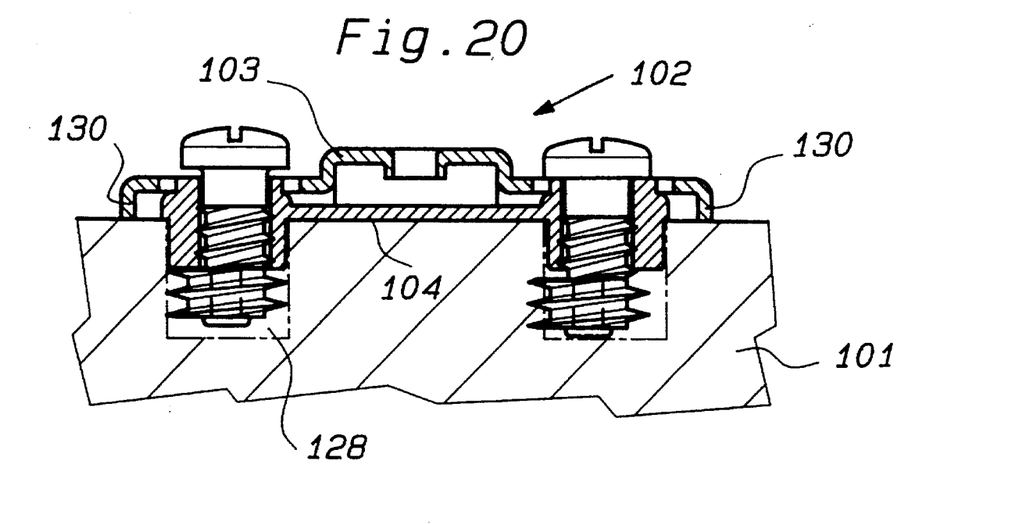

In the mounting position visible from the left of FIG. 20, the pin 116 is turned into a position in which jacket cylinder of the washer 124 defined by the thread pitches 123 is flush with the bushing 106. Here, the jacket cylinder and the bushing have roughly the same diameter. In this mounting position the bushing with flush washer is inserted into a previously drilled blind hole 128 of the furniture plate 101 which blind hole 128 has roughly the same diameter as the bushing 106. By a turn of around 180°, the pin 116 is turned out of its prepared mounting position visible from the left of FIG. 20 into its interlocking position visible from the right of FIG. 20. In the interlocking position the cutting thread pitches 123 of the washer 124 cut into the side walls of the blind hole borehole 128 in a radial direction.

The length of the shaft parts 119, 121 of the pin 116 is around just less than half of the pitch of the thread pitches 120 larger than the length of the continuous borehole 107 so that the pin 116 by being turned through this distance can be screwed into and also again out of the borehole 107.

If the pin 116 is turned from its position visible from the left of FIG. 20 by around 180° into its interlocking position visible from the right of FIG. 20, the head 118 lies on the edges of the oblong hole 114 of the fastening plate 101 and clamps these against the furniture plate 101. The fastening plate 103 is provided in the manner visible from FIG. 20 with an edge 130 against the furniture plate 101 which edge can be additionally supported on the furniture plate.

Figure 21:
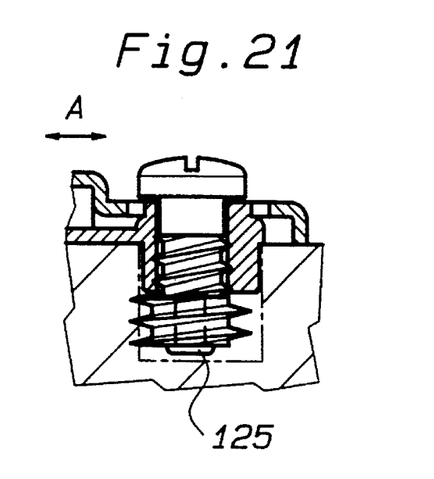
Figure 22:
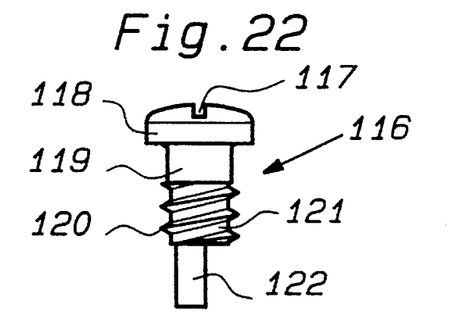
Figure 23:
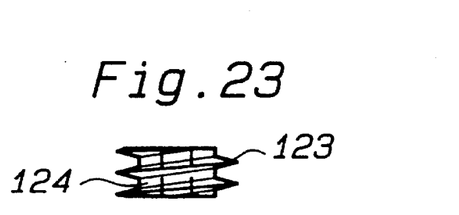
Figure 24:
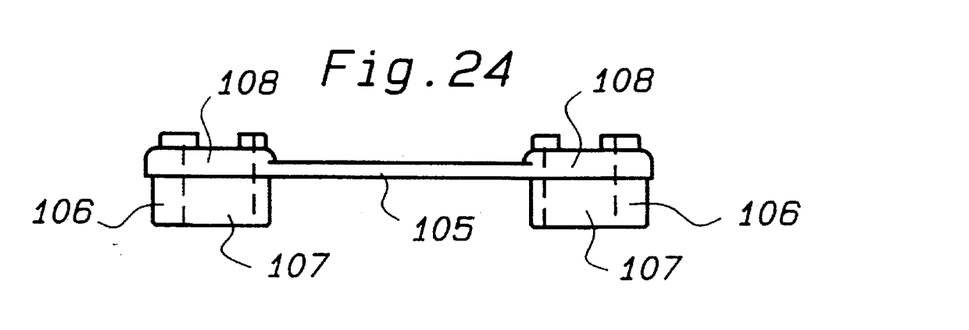
Figure 25:
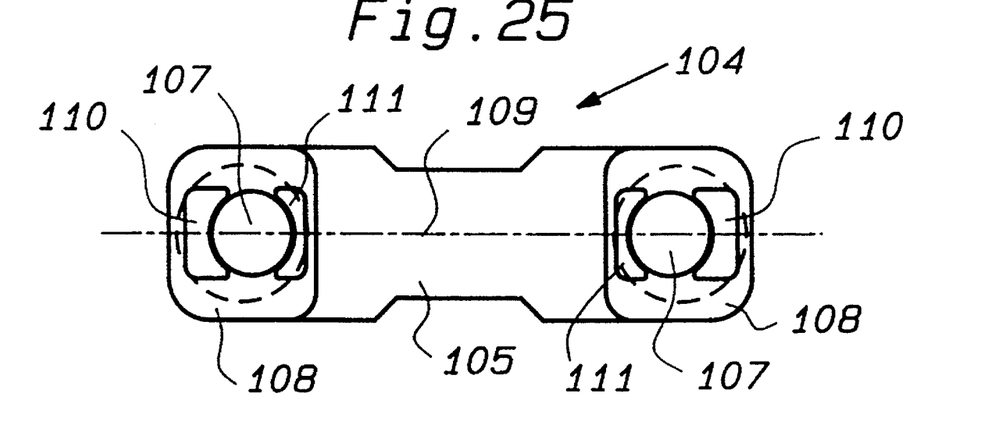
Figure 26:
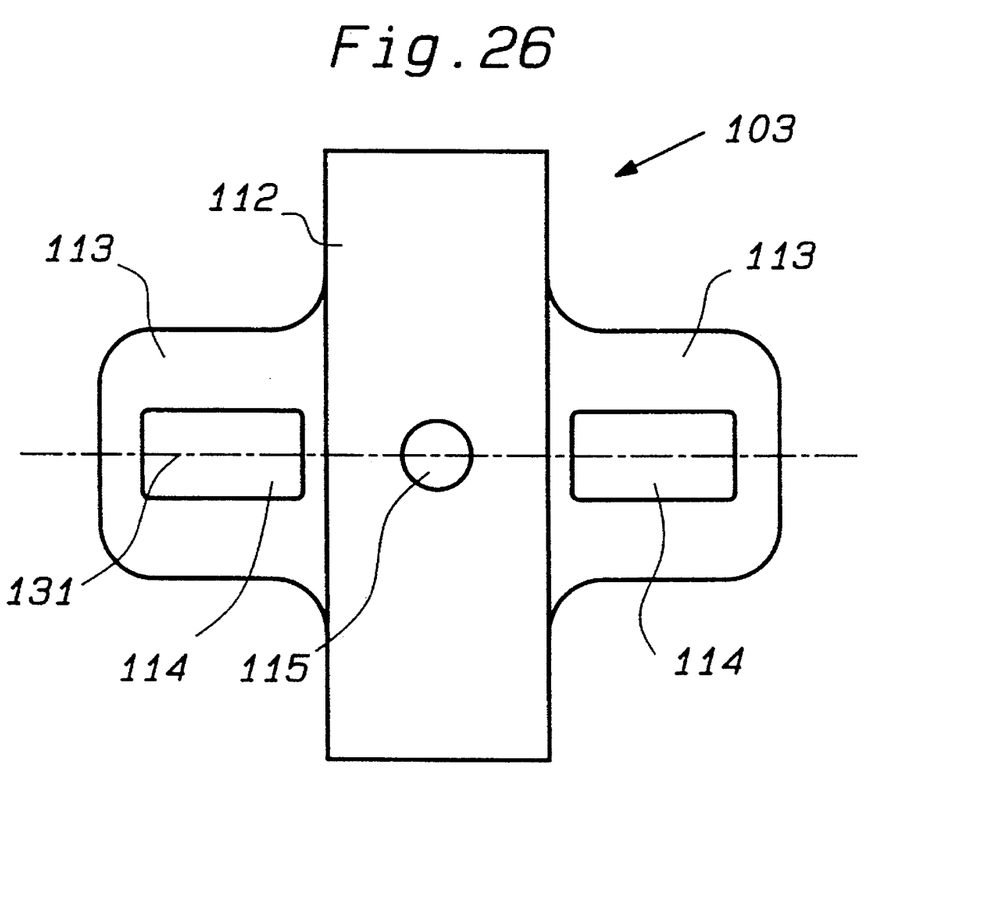

If after its assembly the fastening plate 103 should be adjusted in the direction of the centre-line running through the oblong holes 114, the pin 116 is turned back by a turn of less than 180°, for example by a turn of around 45°, to its open position, so that the cutting thread pitches 123 of the washer 124 still grip in an arresting manner the walls of the blind hole borehole 128 in the manner visible from FIG. 21, the head 118 is raised a small distance over the edges of the oblong holes 114 and the fastening plate 103 can be adjusted relative to the under-plate 104 in the direction of the double arrow A in FIG. 21 for adjustment. Once the desired adjustment has been made, the two pins 116 are again tightened by a turn, for example by around a quarter-turn.

An over-turning of the pin 116 in the opening direction is prevented in that the washer 124 contacts the lower ring-shaped front surface of the bushing.

A final embodiment example of the invention is explained by means of FIGS. 27 to 36.

Figure 27:
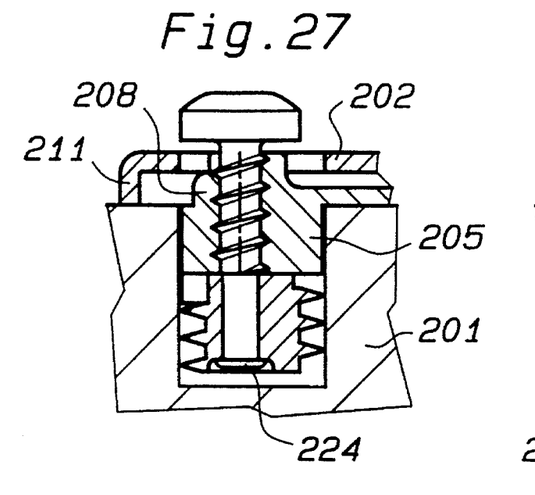
Figure 28:
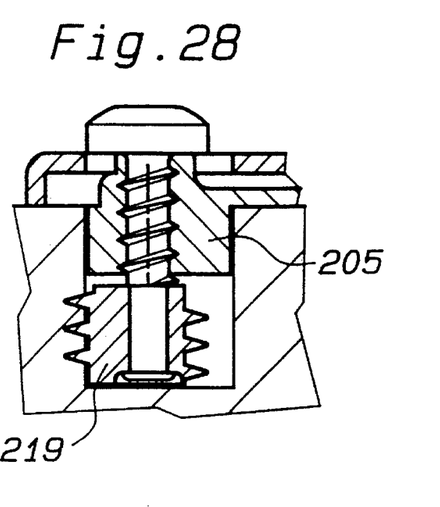
Figure 29:
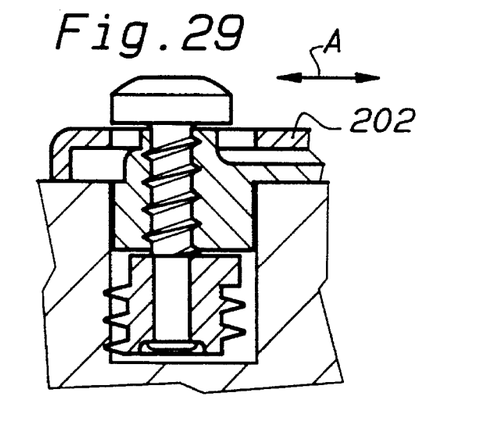
Figure 30:
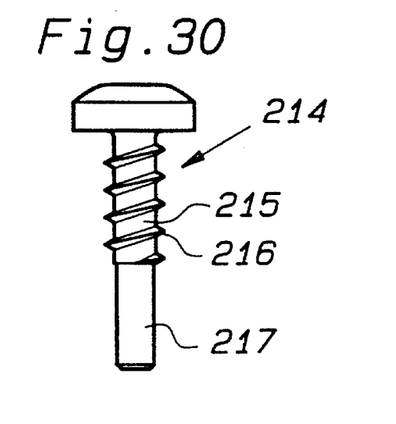
Figure 31:
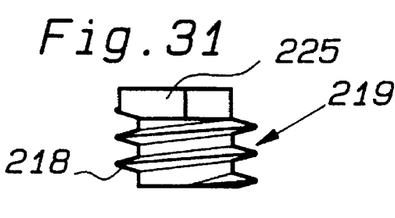
Figure 32:
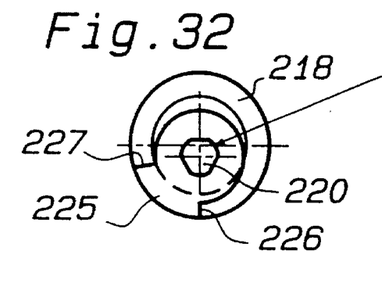
Figure 33:
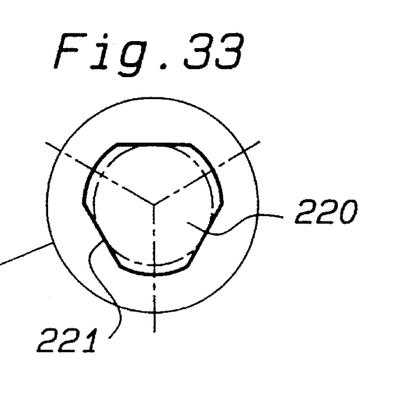
Figure 34:
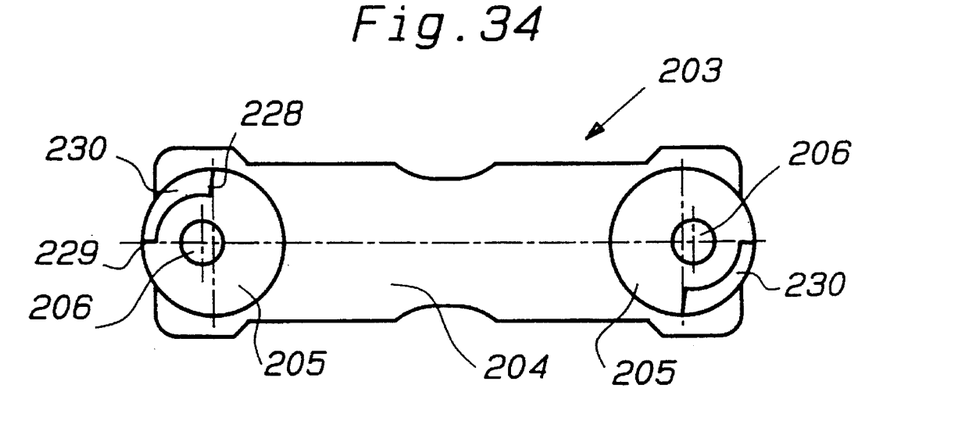
Figures 35, 36:
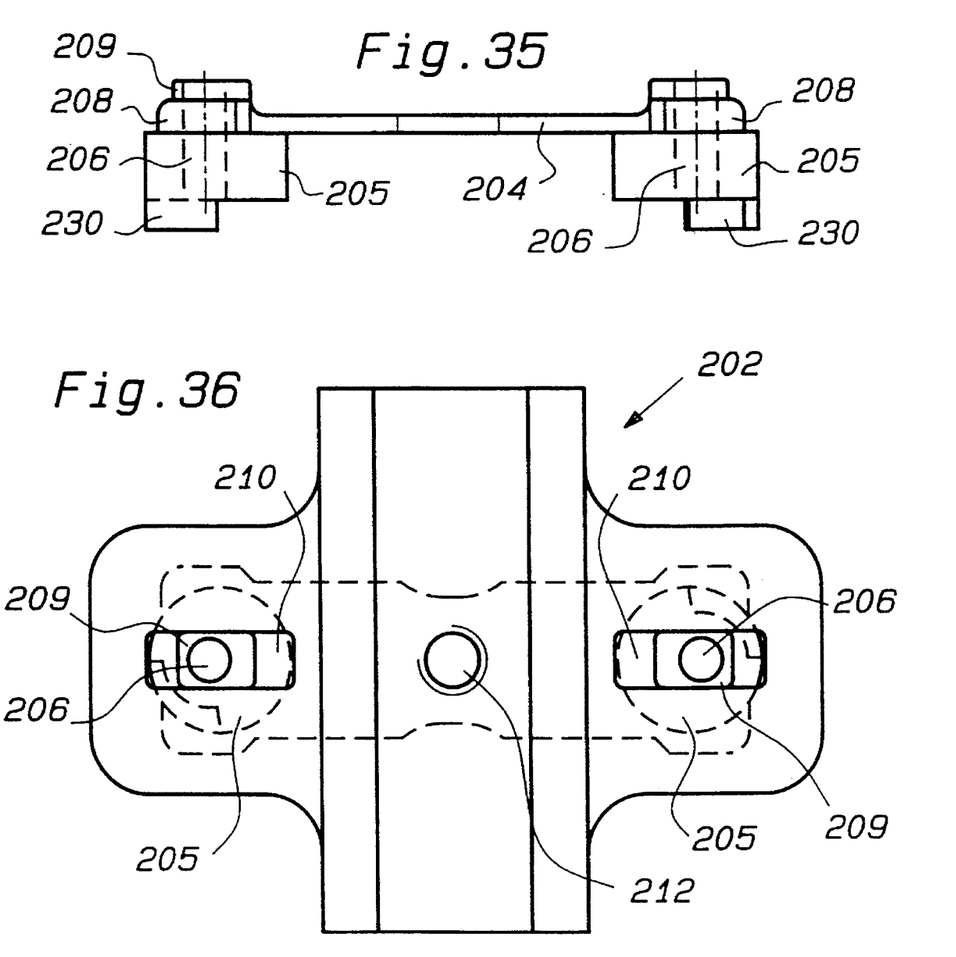

FIGS. 27 to 29 show a cross-section through the left-hand flank visible from FIG. 36 of the mounting plate with the fastening device in accordance with the invention which are shown in various assembly positions.

The mounting plate 202 covers an under-plate 203 provided with the fastening device and serves to fasten, for example, a hinge arm of a furniture hinge.

The under-plate 203 consists of an essentially strip-shaped plate part 204, preferably made from plastic, whose end areas are provided in one piece with dowel-like bushings 205 which possess eccentric continuous boreholes 206. On the side opposite the bushings 205 the under-plate 203 is provided with base-like elevations 208 which on their upper side in a top view bear roughly rectangular guide pieces 209 which are also penetrated by the boreholes 206. In the side flanks of the mounting plate 202, which as flange-shaped parts serve for its fastening, oblong holes 210 are provided whose widths correspond to the widths of the guide pieces 209 whose sides contact the edges of the oblong holes 210 so that the mounting plate can be adjusted when the fastening device is loosened in accordance with the length of the oblong holes 210 on the guide pieces 209 with the lower edge areas of the oblong holes being supported on the base-like elevations 208. The side flanks of the mounting plate 202 are provided with a circumferential edge 211 flanged in the direction of the piece of furniture 201 with the height of said edge corresponding to the height of the base-like elevations 208.

The mounting plate 202 possesses an elongated centre-piece and is connected cruciformly to the flank parts which are provided on a centre-line with crosses the centre-piece with the oblong holes 210. The mounting plate 202 is provided with a central taphole 212 which serves for the fastening of a hinge arm or of another fitting part.

In the eccentric boreholes 206 of the dowel-like bushings 205 the pin 214 serving the interlocking is held. The pin 214 is provided at the interface of a head provided with a slit or a cross-slit with a shaft part 215 which possesses a self-cutting thread 216. The shaft part 215 provided with the self-cutting thread 216 is continued by a shaft part 217 without thread of lower thickness. On this shaft part 217 without thread a washer 219 provided with a self-cutting thread 218 is placed which washer is provided with an eccentric borehole 220. The eccentric borehole possesses between round borehole sections straight sides 221 which span a triangle as can best be seen from FIG. 33.

To mount the fastening device the under-plate 204 is inserted in the manner visible from FIG. 36 into the mounting plate 202 in such a way from the bottom that the sides of the guide pieces 209 contact the edges of the oblong holes 210 in a force locking manner. Subsequently, the pin 214 is screwed into the eccentric boreholes 206 of the dowels 205 so far that the bottom side of the head of the pin still has a distance to the upper side of the flank parts that corresponds to roughly half of the pitch height of the self-cutting thread 216. In this position of the pin 214 visible from FIG. 27, the lower end of the shaft part provided with the self-cutting thread is located in the plane of the lower front surface of the bushing 205. In this position, the washer 215 is pushed onto the shaft part 217 without thread of the pin 214 and aligned in such a way that the jacket cylinder of the washer 219 is flush with the mantle surface of the bushing 209. After this alignment, the lower end of the shaft part 217 is riveted on this to fasten the washer 219. During the forming of the rivet head 224, the lower end of the shaft part 217 undergoes compression which widens the rivet head so that at least that shaft part interfacing with the rivet head 224 largely fills out the polygon profile 221 of the borehole 220 of the washer 219 and the washer 219 is connected to the shaft part 217 in a form locking manner and therefore in a non-turnable manner with the shaft part 217. In this position, the fastening device is in its mounting position as visible from FIG. 27 in which it can be introduced into the blind hole previously drilled into the piece of furniture 201 without any obstacle.

The washer 219 is provided on its upper end above the self-cutting thread 218 with a sector-like radial continuation 225 whose sides 226, 227 form stops for counter-stops 228, 229 which are created from the sides of an axial continuation 230 of the bushings 205. Here, the stops and the counter-stops 226 to 228 are coordinated with one another in such a way that stops which correspond to each other in each case contact each other if the pin is located in its mounting position as visible from FIG. 27 in which the jacket surface of the washer 219 is flush with the mantle of bushing 205 and if in the other position, turned through around 180°, the washer has been turned out of the extended contour of the mantle of the bushing 205 by the largest eccentricity.

In the mounting position visible from FIG. 27, the upper front side of the washer 219 contacts the lower front side of the bushing 205 so that in addition to the stops, a stop is created which secures the mounting position.

In the interlocked position visible from FIG. 28, the washer 219 is mined through around 180° relative to the position visible from FIG. 27 so that the cutting thread pitches 218 cut into the walls of the blind hole borehole. In the position visible from FIG. 28, the head of the pin 214 presses the mounting plate in a clamping action against the piece of furniture 201.

In the position visible from FIG. 29, the pin has been turned back relative to the position visible from FIG. 28 through an angle of less than 180° so that the head has been slightly raised above the mounting plate 202 without, however, the cutting thread pitches 218 being raised out of their meshing with the walls of the blind hole borehole. By this mining back, the fastening device has been subjected to a certain loosening so that the mounting plate 202 can be moved for its adjustment in the direction of the double arrow A. After the desired adjustment, the pin can then be tightened again in its position visible from FIG. 28.

The invention claimed is:

1. Fastening device for a fitting part provided with a fastening borehole comprising:

a bushing which can be inserted in the fastening borehole and which possesses a continuous hole in its axial direction, a pin pivoted in the continuous hole and provided with a head and penetrating the fastening borehole, the continuous hole being positioned eccentrically in the bushing and the pin being provided with an eccentric shaft part which extends beyond the continuous hole, and a clamping part fastened on said eccentric shaft part.

2. Fastening device in accordance with claim 1, characterised in that the eccentric shaft part possesses a smaller diameter than a shaft part of the pin resting in the bushing.

3. Fastening device in accordance with claim 1, characterised in that the bushing is provided with a flange which is held in a non-turning position by the fitting part with a radial protrusion.

4. Fastening device in accordance with claim 1, characterised in that the clamping part is at least one washer.

5. Fastening device in accordance with claim 4, characterised in that eccentricities of the bushing and of the eccentric shaft part are coordinated with one another in such a way that the at least one washer, in one turn position of the pin, is concentric with the bushing and, in another turn position of the pin, protrudes over the bushing radially.

6. Fastening device in accordance with claim 4, characterised in that the at least one washer is provided with at least one blade-shaped, spiral thread pitch.

7. Fastening device in accordance with claim 4, characterised in that the at least one washer has the same diameter as the bushing.

8. Fastening device in accordance with claim 4, characterised in that the eccentric shaft part is riveted to the at least one washer.

9. Fastening device in accordance with claim 4, characterised in that the eccentric shaft part is screwed to the at least one washer.

10. Fastening device in accordance with claim 4, characterised in that the head is provided with a radial continuation which limits turning of the pin.

11. Fastening device in accordance with claim 10, characterised in that the continuation allows turning of the pin through around 180 degrees.

12. Fastening device in accordance with claim 10, characterised in that the continuation is a nose-shaped protrusion positioned in a sector-shaped recess in the fitting part.

13. Fastening device in accordance with claim 10, characterised in that the at least one washer, when one side of the continuation contacts a stop, is flush with the bushing in an axial direction and, when another side of the continuation contacts a stop, protrudes in a radial direction.

14. Fastening device in accordance with claim 1, characterised in that the head is defined by a lever located above the fastening borehole.

15. Fastening device in accordance with claim 14, characterised in that the lever consists of a plate part which, in its closing position, covers part of the fitting part.

16. Fastening device in accordance with claim 1, characterised in that a part of the pin passing through the continuous hole is provided with a thread which meshes, in a self-cutting manner, into a wall of the continuous hole.

17. Fastening device in accordance with claim 16, characterised in that eccentricities of the bushing and the eccentric shaft part are coordinated with each other in such a way that, in one turn position of the pin, the clamping part is concentric with the bushing and, in another turn position of the pin, the clamping part protrudes over the bushing radially.

18. Fastening device in accordance with claim 16, characterised in that the eccentric shaft part possesses a smaller diameter than a shaft part of the pin pivoted in the continuous hole.

19. Fastening device in accordance with claim 16, characterised in that the eccentric shaft part is riveted to the clamping part.

20. Fastening device in accordance with claim 16, characterised in that the part of the pin passing through the continuous hole is longer between the head and the clamping part than the bushing.

21. Fastening device in accordance with claim 20, characterised in that the part of the pin is around half of a thread pitch longer than the bushing.

22. Fastening device in accordance with claim 16, and further comprising an additional bushing and an under-plate to which said bushing and said additional bushing are connected, the fitting part being fastened to and at least partially covering the under-plate.

23. Fitting part in accordance with claim 22, characterised in that the bushings are provided with collar-shaped protrusions which contact side edges of oblong holes in the fitting plate in a force locking manner.

24. Fastening device in accordance with claim 23, characterised in that the collar-shaped protrusions are positioned so that only opposite sides of the protrusions contact the side edges of the oblong holes.

25. Fastening device in accordance with claim 22, characterised in that the bushings are supported on a lower side of the fitting part with the front sides of base-shaped elevations.

26. Fitting part in accordance with claim 16, characterised in that the clamping part is a washer.

27. Fitting part in accordance with claim 26, characterised in that the washer has a diameter which is larger than a diameter of the part of the pin provided with the thread.

28. Fastening device in accordance with claim 27, characterised in that the diameter of the washer corresponds to an outside diameter of the bushing.

29. Fastening device in accordance with claim 26, characterised in that the washer is provided with at least one blade-shaped, spiral-shaped thread pitch.

30. Fastening device in accordance with claim 26, characterised in that the washer is provided with at least one circumferential, blade-shaped edge.

31. Fastening device for a fitting part provided with a fastening borehole comprising:

a bushing which can be inserted in the fastening borehole and which possesses a continuous hole in its axial direction, a pin pivoted in the continuous hole and provided with a head and penetrating the fastening borehole, the continuous hole being positioned eccentrically in the bushing and the pin being provided with a shaft part at its end, and a clamping part fastened on said shaft part eccentrically and in a non-turning manner.

32. Fastening device in accordance with claim 31, characterised in that a shaft part of the pin passing through the continuous hole is provided with a thread which meshes, in a self-cutting manner, in a wall of the continuous hole.

33. Fastening device in accordance with claim 31, characterised in that the shaft part at the end possesses a smaller diameter than a shaft part of the pin pivoted in the continuous hole.

34. Fastening device in accordance with claim 31, characterised in that the clamping part is at least one washer with an eccentric borehole.

35. Fastening device in accordance with claim 34, characterised in that the shaft part at the end is riveted to the washer.

36. Fastening device in accordance with claim 35, characterised in that a borehole of the washer possesses a polygon profile at least in an area of a rivet head of the shaft part.

37. Fitting part in accordance with claim 34, characterised in that the washer has a diameter which is larger than a diameter of a part of the pin passing through the continuous hole.

38. Fastening device in accordance with claim 34, characterised in that the washer has a diameter which corresponds to an external diameter of the bushing.

39. Fastening device in accordance with claim 34, characterised in that the at least one washer is provided with at least one blade-shaped, spiral thread pitch.

40. Fastening device in accordance with claim 34, characterised in that eccentricities of the bushing and of the borehole are coordinated with each other in such a way that, in one turning position of the pin, the clamping part is concentric the bushing and in another turning position protrudes over the bushing radially.

41. Fastening device in accordance with claim 34, characterised in that the at least one washer is provided with at least one circumferential, blade-shaped edge.

42. Fastening device in accordance with claim 31, and further comprising an additional bushing and an under-plate to which said bushing and said additional bushing are connected, the fitting part being fastened to and at least partially covering the under-plate.

43. Fitting part in accordance with claim 42, characterised in that the bushings are provided with collar-shaped protrusions contacting side edges of oblong holes in the fitting part.

44. Fastening device in accordance with claim 43, characterised in that the collar-shaped protrusions are situated so that only sides of the protrusions contact the side edges of the oblong holes.

45. Fastening device in accordance with claim 42, characterised in that the bushings are supported on a lower side of the fitting part with the front sides of base-shaped elevations.

46. Fastening device in accordance with claim 31, characterised in that the bushing is provided with an axial continuation having sides which form stops for a radial continuation of the pin.

47. Fastening device in accordance with claim 46, characterised in that the construction is formed in a sector-shaped manner.

48. Fastening device in accordance with claim 46, characterised in that the radial continuation is situated on an upper end area of the clamping part.

49. Fastening device in accordance with claim 46, characterised in that the stops allow a turning of the pin in the bushing of around 180°.

50. Fastening device in accordance with claim 31, characterised in that a part of the pin passing through the continuous hole is longer between the head and the clamping part than the bushing.

51. Fastening device in accordance with claim 50, characterised in that the part of the pin is around half of a thread pitch longer than the bushing.

52. Fastening device for a fitting part provided with a fastening borehole comprising:

at least one ring-shaped insertion part which can be inserted in the fastening borehole and which possesses a continuous hole in its axial direction, a pin pivoted in the continuous hole and provided with a head and penetrating the fastening borehole, the continuous hole being positioned eccentrically in the at least one ring-shaped insertion part and the pin being provided with an eccentric shaft part which extends beyond the continuous hole, and a clamping part fastened on said eccentric shaft part.

53. Fastening device in accordance with claim 52, characterised in that the clamping part is at least one washer.

54. Fastening device in accordance with claim 53, characterised in that the at least one washer is provided with at least one circumferential, blade-shaped edge.

55. Fastening device in accordance with claim 54, characterised in that several washers with circumferential, blade-shaped edges rest on several eccentric shaft parts.

56. Fastening device in accordance with claim 53 characterised in that the head is provided with a radial continuation which limits turning of the pin.

57. Fastening device in accordance with claim 56, characterised in that the continuation is an edge area concentric with the head and widened in a sector-shaped manner with step-shaped transitions to a circumferential rim of the head which form stops.

58. Fastening device in accordance with claim 53, characterised in that the at least one washer is trapezium shaped in cross-section.

59. Fastening device in accordance with claim 53, characterised in that the pin includes two shaft parts of different diameters which each possess eccentric shaft parts, in that the two shaft parts penetrate eccentric boreholes of said at least one ring-shaped insertion part and in that the each washer is held on one of the eccentric shaft parts.

60. Fastening device in accordance with claim 53, characterised in that the eccentric shaft part is riveted to the at least one washer.

61. Fastening device in accordance with claim 53, characterised in that the at least one washer has the same diameter as the at least one ring-shaped insertion part.

\* \* \* \* \*